July 6, 1926.
C. H. PRINTZ
1,591,336
BASKET
Filed May 28, 1924
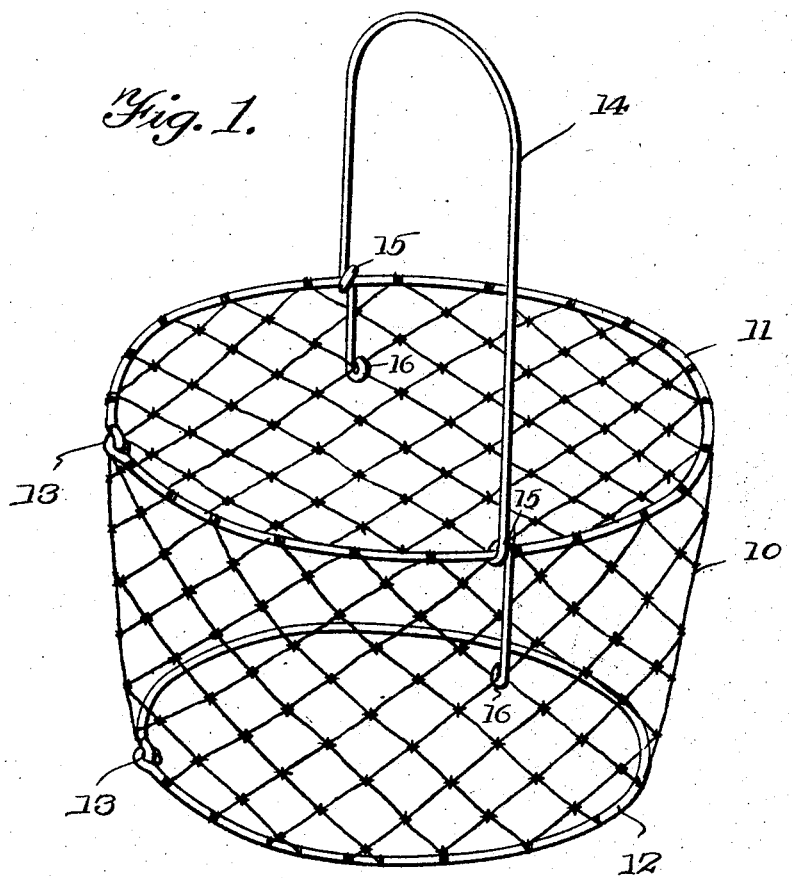
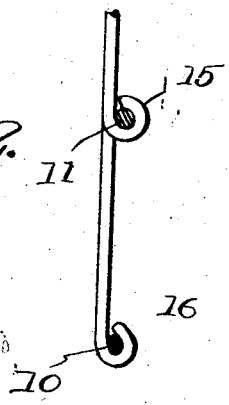

Patented July 6, 1926.

1,591,336

UNITED STATES PATENT OFFICE.

CHARLES H. PRINTZ, OF LURAY, VIRGINIA.

BASKET.

Application filed May 28, 1924. Serial No. 716,468.

It is the purpose of this invention to provide a wire basket primarily designed to receive and display fruit in store windows and the like, and contemplates a basket equipped with a handle which can be quickly and conveniently attached to the basket in a manner to prevent casual separation of the handle therefrom, or movement of the handle with relation to the basket.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is a perspective view.

Figure 2 is a fragmentary sectional view showing how one end of the handle is secured to the basket.

Referring to the drawing in detail, 10 represents the body of the basket which is adapted to be constructed from wire of any suitable mesh. This wire is secured to spaced upper and lower rings 11 and 12 respectively which are also formed from single lengths of wire and terminally connected together as at 13. It might here be stated that the basket can be constructed in any suitable size, and also vary in shape or design without departing from the spirit of the invention. The basket is provided with a handle formed from a single length of wire, and of inverted U-shape formation as shown, the handle being herein indicated at 14. Each side of the handle is formed with a coil 15 which receives the upper ring 11 of the basket at diametrically opposite points, these coils being formed at appropriate points in the length of said sides. Each side is extended an appreciable distance beneath the coil 15, and terminates to provide a hooklike extremity 16 adapted to receive the strands of wire constituting the body 10 of the basket. By reason of this construction the handle cannot be casually separated or pulled from the basket, and is furthermore so associated with the basket that relative movement of the handle with relation to the upper ring 11 is prohibited.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A wire basket including spaced upper and lower rings, a bail like handle including spaced parallel sides, coils formed in said sides at an appropriate point in their length and arranged to surround the uppermost ring of the basket at directly opposite points, said coils being extended downwardly along the sides of the basket and terminating in hooks adapted to engage the adjacent sides of the basket at points adjacent said ring for the purpose specified.

In testimony whereof I affix my signature.

CHARLES H. PRINTZ.